United States Patent Office 3,072,586
Patented Jan. 8, 1963

3,072,586
PARAFFIN WAX VINYL CHLORIDE COATED
STABILIZER
Adrian Richard Pitrot, Uniondale, N.Y., and John G. Hendricks, Boonton, N.J., assignors to National Lead Company, New York, N.Y., a corporation of New Jersey
No Drawing. Filed June 9, 1958, Ser. No. 740,541
3 Claims. (Cl. 260—28.5)

This invention relates to particulate substances coated with paraffinic materials, to processes for producing such coated substances, and to compositions containing such coated substances. In particular, this invention relates to particulate, paraffin-coated addition agents for elastomer compositions, to methods for producing such coated addition agents, and to elastomer compositions containing such coated addition agents.

Paraffin coated materials are generally well known to the art. However, commercial applications of paraffinic coated particulate materials have been decidedly limited. Compositions of this type have heretofore found some use in the manufacture of insulating materials where a moisture-resistant expanded agglomerate was desired and in compositions where it was necessary to prolong the storage life of unstable materials. In addition, particulate substances have also been coated to reduce dusting, staining and the possible skin diseases resulting therefrom. However, all of these compositions failed to exhibit completely coated moisture-resistant individual particles but rather exhibited partially, nonuniform coated particles usually in the form of agglomerates. Furthermore it has not heretofore been known that paraffin-coated particulate materials might be employed as addition agents in elastomer compositions. The known methods for producing a paraffin wax coating on particulate substances, such as those mentioned above, had several objectional features. Methods employing mixtures of powders and a combination of wax and an inert solvent resulted in the formation of stiff pastes in which the powders were imbedded rather than uniform wax coatings on the particulate materials. Methods which effected a coating on water-soluble particulate substances generally employed salt solutions as the particulate material dispersing medium. This resulted in a product in which salt particles were left associated with the wax coating rendering the product unsuitable for uses in which the maximum electrical insulating properties of the coated materials were necessary. In addition it was difficult to produce a complete coating of the materials due to the high attraction of the dispersed materials to the salts in the medium. In fact, in most instances it was necessary to incorporate an emulsion breaking agent, to the combined mixtures of dispersed materials and the wax emulsion, to effect at least a partial layer of wax onto the particulates.

In the formulation and processing of elastomer compositions it is customary, depending on the properties desired in the finished compositions, to incorporate solid materials as addition agents. The addition agents include, for example, fillers, reinforcing agents, pigments and, in vinyl chloride resin compositions in addition to these, stabilizers. The addition agents, other than stabilizers, usually function to impart specific physical properties to the elastomer compositions and to reduce the material costs. The stabilizers, in the resins, are necessary for retarding the degradation ordinarily brought about in such compositions by exposure to heat and light.

Most of the addition agents commercially employed are solid materials in particulate form, for example, clays and whitings and in the case of stabilizers, inorganic salts of heavy metals, metal soaps and metal-organic compounds in finely-divided powder form.

Difficulty has frequently been experienced in preparing elastomer compositions containing such addition agents, because of difficulty experienced in obtaining a uniform dispersion of the addition agents in the batch. The addition agents typically are finely-ground dry powders with large surface areas and are not readily wetted by or dispersed in the batch, thereby resulting in a time loss, local variations and a reduction in the desirable physical properties. In addition, many of them are hydrophilic and organophobic in nature, which further increases the difficulty of wetting and dispersing them. Also many important stabilizing agents, particularly the salts of organic acids and the metal-orgnaic compounds tend to adhere to the rolls used in blending the batch or in the extruder head and thereby further increase the processing difficulties encountered.

Many of the addition agents suffered from still another disadvantage in that they had a tendency to agglomerate during storage, particularly when stored under pressure, e.g. in bags stacked in a warehouse. This tendency still further aggravated the dispersion difficulties already alluded to.

It has been proposed, in order to alleviate these and similar disadvantages, to coat the addition agent with a substance such as a fatty acid, for example stearic acid, or the like. The fatty acid tends to isolate the particles, so that they do not agglomerate during storage. The fatty acid, being a polar-nonpolar molecule, acts as a dispersing agent and facilitates the dispersion of the addition agent uniformly throughout the resin batch. It also retards absorption of moisture by the addition agents. Moisture absorption is frequently a contributing factor in the agglomeration experienced on storage, and in decreasing the electrical resistivity of the finished compound.

The use of fatty acids, however, has a serious disadvantage, namely the fact that its impairs the electrical resistivity of the finished compositions, particularly at elevated temperatures. Elastomers in general are good electrical insulators, and their use as such constitutes one of their largest commercial applications. Even relatively small differences in the electrical resistivity of the elastomers are of considerable significance.

An object of this innvention, therefore, is to provide an improved addition agent for elastomer compositions. Another object is to provide an addition agent for elastomer compositions characterized by each dispersibility in such compositions. Still another object is to provide an addition agent for elastomer compositions which is free of deleterious effects upon the electrical resistivity of the finished compositions. A further object is to provide an improved stabilizing addition agent for vinyl resin compositions characterized by the aforesaid advantages. A still further object is to provide an improved method for the production of a surface coating on a particulate addition agent for elastomer compositions. Yet another object is to provide an improved method for the production of a surface coating on a particulate stabilizing addition agent for vinyl resin compositions. An additional object is to provide an improved elastomer composition containing an addition agent characterized by improved electrical resistivity. A yet further object is to provide an improved vinyl resin composition containing an addition agent and characterized by improved electrical resistivity. Other objects and advantages will become apparent from the following more complete description and claims.

Broadly, this invention contemplates a particulate substance useful as an addition agent for elastomer compositions, the surface of said particulate substance being coated with a paraffinic hydrocarbon.

This invention also contemplates a method for the preparation of a paraffin-coated addition agent for elastomers which comprises the steps of providing a mixture of a water-insoluble addition agent with water, forming an emulsion of water and a paraffinic hydrocarbon, mixing said water-addition agent mixture with said paraffin-water emulsion to form a second mixture, and removing water from said second mixture.

This invention further contemplates an elastomer composition comprising an addition agent in particulate form, the particles of said agent being coated with a paraffinic hydrocarbon.

This invention is applicable in general to particulate substances which are useful as addition agents for elastomer compositions. It is applicable, for example, to pigments such as titanium oxide, antimony oxide, iron oxide, blanc fixe, zinc oxide, magnesium carbonate, lithopone and the like, filler materials such as clays, modified clays, whitings, diatomaceous silica and similar materials, vinyl resin stabilizers such as lead soaps and salts, basic lead soaps and salts, normal and basic cadmium soaps, basic lead sulfates, basic lead carbonate, lead silicate sulfate compositions, basic carbonate white lead, basic silicate white lead, basic lead phthalates, basic lead phosphites, basic lead fumarates and basic lead salts of aliphatic dicarboxylates in general, sodium salts and soaps, organotin salts and similar materials. In general, any substance of a particulate nature (by which is meant a substance existing in the form of small, discrete, solid particles) and which is insoluble in water is amenable to the process of this invention and may be used as a starting material for production of coated products according to this invention. The invention is particularly useful, however, in the case of those materials which are by nature hydrophilic and organophobic, especially if they are also hydroscopic, as it is with these that the above-mentioned disadvantages are most severe, and the benefits to be reaped are correspondingly greater.

For best results, it is preferred that the surface of the particles be entirely coated with the paraffinic coating agent. Theoretically, an amount of coating agent sufficient to provide a monomolecular layer should be sufficient to achieve this result. In practice, however, it is desirable to use somewhat more than this theoretical quantity in order to ensure a continuous coating. It is preferred to operate in such a way that there is left associated with the mass of addition agent an amount between about 0.1 and about .15 gram of coating agent per square meter of surface area.

Paraffinic hydrocarbons useful as coating agents according to this invention include the saturated aliphatic hydrocarbons of both the straight-chain and branched-chain types having a melting point, as determined by A.S.T.M. Method D87–57, greater than 48° C.

In the method according to this invention, there is provided a mixture of the addition agent and water. This mixture may be a coarse slurry, a colloidal suspension, or an aqueous paste. All that is necessary is that the addition agent be thoroughly wetted by the water, so that it is easily wetted by the paraffin-water emulsion when the latter is added. In a particularly desirable mode of operation, the mixture of water and addition agent is the wet filter cake resulting after preparation or conditioning of the addition agent in an aqueous system, followed by filtration to remove excess water.

A paraffin-water emulsion of the oil-in-water type is preferred. This type emulsion readily replaces or mixes with the water of the addition agent-water mixture, whereas a water-in-oil emulsion does not readily do so, behaving essentially as if it were a simple oil. Moreover, the water-in-oil emulsion would result in the deposition of a much larger amount of paraffin on the solid surface than is ordinarily desired. The production of the emulsion may be accomplished by known means, as by using a colloid mill, high-speed agitator or the like. To facilitate emulsification, it is usually desirable to add a small amount of a suitable wetting agent, such as morpholine or tri-ethanolamine along with a fatty acid, such as stearic acid, to form an emulsifying soap.

The removal of water from the combined mixture of addition agent, water and paraffin-water emulsion may be accomplished in various ways, for example by evaporation or the like. It is most convenient, however, to agitate the combined mixture for a time, e.g. about 15 to 45 minutes, so as to allow the paraffin particles to become associated with the solid particles of addition agent, and then filter. In order to illustrate more clearly the nature of the present invention and the manner of practising the same, the following examples are presented.

EXAMPLE I 1.85 pounds of refined white paraffin scale wax, having a melting point of 123° F., color +20 and an oil content of 1.50%, was melted together with 0.37 pound of stearic acid and mixed well. While mixing, 0.37 pound of morpholine was added. To this batch 8.55 pounds of hot water (85° C.) was added with vigorous agitation. The resulting smooth emulsion was then added to a 20% solid aqueous suspension of basic carbonate white lead containing 185 pounds of the carbonate at a temperature of 70° C. The combined mixture was agitated for about 30 minutes before the resulting coated product was filtered, dried and milled.

Systems similar to the above, alternately employing tribasic lead sulfate and titanium oxide as the addition agent, instead of basic carbonate white lead resulted in the successful coating of the particulate agents.

EXAMPLE II 4.4 pounds of whiting (ground pure natural calcite) was slurried up with 2.2 pounds of water and heated to 60° C. An emulsion was then prepared by melting together .04 pound of a fully refined white paraffin scale wax, having a melting point of 142° F., color +30 and an oil content of 0.4%, with 0.008 pound of stearic acid. While mixing, 0.008 pound of morpholine was added. With vigorous agitation 0.22 pound of hot water (85° C.) was added. The emulsion was then mixed together with the whiting suspension and agitated for about 30 minutes before the coated product was filtered, dried and milled.

EXAMPLE III

To a slurry containing 2.2 pounds of water and a 4.4 pounds of kaolin clay (pH 5.4) a barium hydrate solution, consisting of 0.0058 pound of BaO, was added to increase the pH to 7.7. The slurry was then heated to 60° C. An emulsion was prepared by melting together 0.04 pound of paraffin scale wax, having a melting point of 124° F. and an oil content of 2%, and 0.008 pound of stearic acid. During mixing 0.008 pound of morpholine was added. With vigorous agitation 0.22 pound of water (85° C.) was then added. The emulsion and the clay suspension were then added together and mixed for about 30 minutes. The coated product was then filtered, dried and milled.

The above prepare addition agents were stored for a period of 6 months during which a marked reduction in agglomerate formation was observed, as compared with untreated controls. The agents were subsequently added to the applicable elastomer compositions in which they readily dispersed so that uniform dispersion throughout the test mediums (rubbers, vinyl resins, etc.) were obtained. This was accomplished with negligible loss of the tested electrical properties of the elastomers compositions particularly at elevated temperatures. In addition, it was determined that the added coated addition agents completely retained their effective physical and chemical properties, depending upon the particular agent employed, in the elastomer compositions.

The following table illustrates the effect on the electrical properties of a vinyl resin after the addition of coated stabilizing agents:

*Table 1*

Batch composition, parts by weight:
 Polyvinyl chloride resin _____ 100
 Dioctyl phthalate _____ 50
 Stabilizer _____ 5

| Test temperatures | Volume resistivity ($10^{12}$ ohm-cm.) at— | | | | |
|---|---|---|---|---|---|
| | 30° C. | 50° C. | 70° C. | 90° C. | 100° C. |
| Stabilizer: | | | | | |
| Uncoated (untreated tribasic lead sulfate) | 440 | 160 | 45 | 10 | 4 |
| Stearic acid coated tribasic lead sulfate | 560 | 180 | 30 | 6 | 2 |
| Paraffin wax coated tribasic lead sulfate | 450 | 160 | 45 | 10 | 4 |

This table clearly illustrates that the wax coated stabilizer imparts no detrimental effect on the electrical properties of the resin over the 30° C.–100° C. temperature range while the stearic acid coated stabilizer shows adverse effects at temperatures of 60° C. and higher.

While this invention has been described in terms of certain preferred embodiments and illustrated by means of specific examples, these are illustrative only and the invention is not to be construed as limited, except as set forth in the following claims.

We claim:
1. A solid-particulate coated material, said material having stabilizing properties with respect to vinyl chloride resin compositions, the surface of said stabilizing particulate material being coated with a paraffin; said paraffin being present in the amount of between .01 and about .15 gram per square meter of surface area of said stabilizing particulate material, said paraffin being selected from the group consisting of saturated straight-chain and saturated branch-chain hydrocarbons having a melting point greater than 48° C.

2. A method for the preparation of a solid-particulate coated material, according to claim 1, which comprises the steps of (1) forming a mixture of a water insoluble stabilizing particulate material with water, (2) forming an emulsion of water and a paraffin, said paraffin being present in the amount of between .01 and about .15 gram per square meter of surface area of said stabilizing particulate material, said paraffin being selected from the group consisting of saturated straight-chain and saturated branch-chain hydrocarbons having a melting point greater than 48° C., mixing said stabilizing particulate material with said emulsion to form a second mixture, and removing water from said second mixture.

3. A vinyl chloride resin composition, comprising as stabilizer therefor, a solid-particulate coated material according to claim 1.

References Cited in the file of this patent
UNITED STATES PATENTS

| | | |
|---|---|---|
| 2,140,745 | Hucks | Dec. 20, 1938 |
| 2,550,631 | Young | Apr. 24, 1951 |
| 2,642,230 | Porges et al. | June 16, 1953 |
| 2,663,695 | Perloff et al. | Dec. 22, 1953 |
| 2,714,077 | Wallace | July 26, 1955 |
| 2,964,418 | Kebrich | Dec. 13, 1960 |